(12) United States Patent
Tomiyoshi

(10) Patent No.: US 8,144,286 B2
(45) Date of Patent: Mar. 27, 2012

(54) LED BACKLIGHT AND LIQUID CRYSTAL DISPLAY DEVICE

(75) Inventor: Akira Tomiyoshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 292 days.

(21) Appl. No.: 12/522,594

(22) PCT Filed: Dec. 4, 2007

(86) PCT No.: PCT/JP2007/073365
§ 371 (c)(1),
(2), (4) Date: Jul. 9, 2009

(87) PCT Pub. No.: WO2008/108039
PCT Pub. Date: Sep. 12, 2008

(65) Prior Publication Data
US 2010/0097541 A1    Apr. 22, 2010

(30) Foreign Application Priority Data
Mar. 8, 2007    (JP) .................................. 2007-059170

(51) Int. Cl.
*G02F 1/1335*    (2006.01)
(52) U.S. Cl. ............. 349/61; 349/58; 362/612; 362/631
(58) Field of Classification Search ........................ None
See application file for complete search history.

(56) References Cited

U.S. PATENT DOCUMENTS

| | | | |
|---|---|---|---|
| 6,330,150 B1 | 12/2001 | Kim | |
| 7,434,978 B2 * | 10/2008 | Chou | 362/631 |
| 2006/0092346 A1 | 5/2006 | Moon et al. | |
| 2006/0103776 A1 * | 5/2006 | Park | 349/58 |
| 2006/0169991 A1 | 8/2006 | Kikuchi | |
| 2007/0047220 A1 | 3/2007 | Kang et al. | |
| 2007/0165424 A1 | 7/2007 | Sakai | |

FOREIGN PATENT DOCUMENTS

| | | |
|---|---|---|
| CN | 1831421 A | 9/2006 |
| CN | 1866565 A | 11/2006 |
| CN | 1904689 A | 1/2007 |
| EP | 0 955 623 A2 | 11/1999 |
| JP | 2005-353498 A | 12/2005 |
| JP | 2006-189606 A | 7/2006 |
| JP | 2007-220663 A | 8/2007 |
| RU | 43334 U1 | 1/2005 |
| RU | 2004 107 564 A | 9/2005 |
| RU | 49328 U1 | 11/2005 |

OTHER PUBLICATIONS

Official Communication issued in International Patent Application No. PCT/JP2007/073365, mailed on Feb. 12, 2008.
Official Communication issued in corresponding Russian Patent Application No. 2009124457, mailed on Jan. 28, 2011.
Official Communication issued in corresponding Russian Patent Application No. 2009124457, mailed on Jan. 28, 2011.

* cited by examiner

*Primary Examiner* — Richard Kim
(74) *Attorney, Agent, or Firm* — Keating & Bennett, LLP

(57) ABSTRACT

An LED backlight in which deterioration in in-plane uniformity of brightness is prevented, whose thickness, frame width, and wire length are reduced, and in which wiring can be carried out easily, includes an LED provided on one surface of an LED substrates; the LED substrate is mounted on a chassis panel so that a surface of the LED substrate opposite to the one surface contacts the chassis panel; and the chassis panel has a connection hole provided in a portion of a region of the chassis panel in which region the LED substrate is mounted, which passes through the chassis panel.

9 Claims, 8 Drawing Sheets

LED BACKLIGHT AND LIQUID CRYSTAL DISPLAY DEVICE

BACKGROUND OF THE INVENTION

1. Field of the Invention

The present invention relates to an LED backlight including LEDs (light-emitting diodes) and a liquid crystal display device using the LED backlight.

2. Description of the Related Art

Conventionally, a backlight has been widely used to illuminate a display panel which is not self-luminous. For example, since a liquid crystal panel used in a liquid crystal display device is not self-luminous, a backlight is used to illuminate a back surface of the liquid crystal panel. The term "backlight" used herein refers to a device which has a function of illuminating a display panel with the use of a light source.

In recent years, an LED backlight including LEDs (light-emitting diodes) has been used as a light source of a backlight. Generally, the LED backlight mainly includes (i) LEDs, (ii) an LED substrate on which the LEDs are mounted, (iii) an LED driver substrate which generates a power supply and a signal for driving and controlling the LEDs, respectively, (iv) a chassis panel on which the LEDs, the LED substrate, the LED driver substrate are fixed with respect to one another so as to define one LED backlight, and (v) wires used for, for example, connecting the substrates.

Various techniques have been proposed for the LED backlight. For example, Japanese Patent Application Publication, Tokukai, No. 2006-128125 A discloses a technique in which an LED and an LED driving element are mounted on a light-emitting unit printed board.

Further, as shown in FIG. 6, Japanese Patent Application Publication, Tokukai, No. 2005-353498 A discloses a technique in which a light-emitting block 100 including a back panel 105 (corresponding to the above-mentioned chassis panel) on which LEDs 110 have been mounted is arranged such that connectors 115 for connecting the LEDs 110 to a control circuit package (not shown, corresponding to the above-mentioned LED driver substrate) are provided on that surface of the back panel 105 on which the LEDs 110 have been mounted. According to this technique, the control circuit package is provided on a rear surface of the back panel 105, and is connected to the LEDs 110 by lead wires 120 (corresponding to the above-mentioned wires) connected to the connectors 115. The lead wires 120 connect both surfaces of the back panel 105 through an extraction hole 125 formed in the back panel 105 so as to be positioned in a place where substrates 119 are not mounted.

Note that FIG. 6, showing a conventional device, illustrates an arrangement of the light-emitting block 100 disclosed in Japanese Patent Application Publication, Tokukai, No. 2005-353498 A.

SUMMARY OF THE INVENTION

In-Plane Uniformity of Brightness

However, the inventor of the present invention discovered that, unfortunately, both of the arrangements disclosed in the above prior art patent application publications cause deterioration in in-plane uniformity of brightness of the LED backlight.

Specifically, according to the arrangements disclosed in above prior art patent application publications, non-LED members (the LED driving element in the arrangement disclosed in Japanese Patent Application Publication, Tokukai, No. 2006-128125 A, and the connectors and the lead wires in the arrangement disclosed in Japanese Patent Application Publication, Tokukai, No. 2005-353498 A) are provided on the same surface on which the LEDs have been provided. As shown in FIG. 7, such members (e.g., the connector 115 in FIG. 7) are directly irradiated with light from the LEDs 110 and are irradiated with light reflected by a member such as a diffusion plate 130. This causes such members to cast shadows, light to be absorbed by such members, and light to be reflected by surfaces of such members in various directions. This causes deterioration in in-plane uniformity of brightness of the LED backlight.

Note that FIG. 7 illustrates an arrangement of an LED backlight 10 in which the connector 115 is provided on the back panel 105.

Thickness

Further, unfortunately, the arrangement disclosed in Japanese Patent Application Publication, Tokukai, No. 2005-353498 A causes the LED backlight to have a very large thickness.

Specifically, an LED generally has a small thickness (e.g., 1 mm or less), whereas a connector and a lead wire each normally has a larger thickness. Therefore, in a case where a connector and/or a lead wire are provided on the same surface as is an LED, the thickness of the LED backlight does not depend on the thickness of the LED, but depends on the thickness of the connector and/or the lead wire. As a result, the LED backlight becomes large in thickness.

Wire Length, Wiring, Frame

Further, an LED backlight may be arranged such that (i) the LED and the LED driver substrate are provided on different surfaces of the chassis panel so that the number of non-LED members provided on the same surface on which the LED has been provided can be reduced, and (ii) the wires connecting both surfaces of the chassis panel are caused to straddle an outer edge of the chassis panel so that the number of wires on the chassis panel can be reduced. The following deals with this arrangement with reference to FIGS. 8 and 9. FIGS. 8 and 9 each illustrate a structure of the LED backlight 10 in which an LED and an LED driver substrate 50 are provided on different surfaces.

As shown in FIGS. 8 and 9, according to the LED backlight 10 arranged as described above, two LED substrates 40 (40a, 40b) are attached to one surface (top surface) of a chassis panel 20, and the LED driver substrate 50 is attached to another surface (rear surface) of the chassis panel 20. Each of the LED substrates 40 is connected to the LED driver substrate 50 by a wire 60. Note that the top surface of the chassis panel 20 refers to a surface to which a display panel such as a liquid crystal panel is to be attached.

Such an arrangement in which the wire 60 for connecting the LED substrate 40 to the LED driver 50 straddles the outer edge of the chassis panel 20 causes an undesirable increase in the length of the wire, and makes it difficult to carry out the wiring process.

Further, since the wire 60 straddles the outer edge of the chassis panel 20, it becomes difficult to reduce the frame width of the LED backlight.

For convenience of explanation, the above description has discussed a structure of one LED backlight in which two LED substrates 40 are used. However, a similar problem arises also in a case where the number of LED substrates 40 is not less than 3. For example, the more that the number of LED substrates 40 increases, the more difficult the wiring becomes.

In view of the above problems, preferred embodiments of the present invention provide an LED backlight in which deterioration in in-plane uniformity of brightness is reliably prevented, whose thickness, frame width, and wire length are reduced, and in which wiring can be carried out easily.

According to a preferred embodiment of the present invention, an LED (Light Emitting Diode) backlight includes: an LED substrate; an LED mounted on one surface of the LED substrate; and a chassis panel on which the LED substrate is mounted such that a surface of the LED substrate opposite to the one surface contacts the chassis panel; wherein the chassis panel has a connection hole, provided in a portion of a region of the chassis panel in which the LED substrate is mounted, which passes through the chassis panel.

According to the above arrangement, the LED substrate can be electrically connected through the connection hole to an external element (e.g., a power supply or a signal line) so as to control the LED.

For example, this reduces the need for a wire or component required for the connection to be provided on that surface of the chassis panel on which the LED has been provided.

Accordingly, a shadow of the wire or component due to light from the LED hardly occurs. This reduces deterioration in in-plane uniformity of brightness of the LED backlight.

Further, since, as described above, there is less need for the wire or components required for the connection to be provided on that surface of the chassis panel on which the LED has been provided, it is possible to prevent an increase in thickness of the LED backlight.

Further, according to the above arrangement, the LED substrate can be electrically connected to the external element through the connection hole. This reduces the need for running the connecting wire across an outer edge of the chassis panel.

This makes it possible to reduce the wire length and makes it easy to carry out wiring. Moreover, assembling workability is improved, so that manufacturing cost can be reduced.

Further, since the wire can be run without straddling the outer edge of the chassis panel, it is possible to reduce frame width.

That is, the above arrangement makes it possible to realize an LED backlight in which deterioration in in-plane uniformity of brightness is prevented, whose thickness, frame width, and wire length are reduced, and in which wiring is carried out easily.

Further, it is preferable that the LED backlight according to a preferred embodiment of the present invention is arranged such that an LED driver substrate arranged to drive the LED is mounted on a surface of the chassis panel opposite to a surface on which the LED substrate is mounted; and the LED substrate and the LED driver substrate are electrically connected to each other through the connection hole.

According to the above arrangement, the LED substrate and the LED driver substrate provided on different surfaces of the chassis panel need to be electrically connected to each other, and the electrical connection can be made through the connection hole.

As described above, this reduces the need for the wire or component required for the connection to be provided on that surface of the chassis panel on which the LED has been provided, and reduces the need for running the wire across the outer edge of the chassis panel.

As a result, even in the case of an LED backlight in which an LED driver substrate and an LED substrate are mounted on different surfaces, it is possible to realize an LED backlight in which deterioration in in-plane uniformity of brightness is prevented, whose thickness, frame width, and wire length are reduced, and in which wiring is carried out easily.

Note that the LED driver substrate refers to, for example, a substrate which generates a power supply and a signal for driving and controlling an LED, respectively.

Further, the LED backlight according to a preferred embodiment of the present invention may be arranged such that the chassis panel has a plurality of LED substrates mounted on a same surface thereof; and the chassis panel has connection holes provided in regions thereof in which regions the plurality of LED substrates are mounted, respectively; and at least two or more of the plurality of LED substrates are electrically connected to one another through the connection holes.

According to the above arrangement, even in cases where two or more LED substrates are mounted and need to be electrically connected to one another, it is possible to prevent deterioration in in-plane uniformity of brightness, to prevent an increase in thickness and an increase in wire length, to easily carry out wiring, and to reduce frame width, as described above.

Further, it is preferable that the LED backlight according to a preferred embodiment of the present invention is arranged such that the chassis panel has a plurality of LED substrates mounted on a same surface thereof; and at least one LED driver substrate arranged to drive the LED is mounted on a surface of the chassis panel opposite to a surface on which the plurality of LED substrates are mounted; and at least one of the at least one LED driver substrate is electrically connected to plural ones of the plurality of LED substrates through the connection holes.

The above arrangement makes it possible to reduce the number of connection holes that are provided in the chassis panel.

For example, there is a case where it is necessary that (i) each of the LED substrates is connected to any of the LED driver substrates, and (ii) the LED substrates are connected to each other. However, if an LED driver substrate is connected to at least two LED substrates, direct connection between LED substrates connected to the LED driver substrate is not required. This is because, the LED substrates can be electrically connected to each other via the LED driver substrate to which both of the LED substrates are connected, as in the case of direct connection.

Further, a connection hole through which the LED substrates are directly connected to each other can be omitted by connecting the LED substrates to the LED driver substrate as described above.

As a result, it is possible to reduce the number of connection holes that are provided in the chassis panel.

This is especially advantageous in a case where a large area (e.g., a large screen) needs to be irradiated. For example, in a case where a screen whose width is more than 1 m needs to be irradiated, a plurality of LED substrates are preferably connected to one another so that the screen can be uniformly irradiated. This is because the maximum length of an LED substrate which can be manufactured is generally a little over 50 cm. In such a case, from a viewpoint of easy manufacturing, it is advantageous to reduce the number of connection holes.

Generally, an LED substrate is disposed in a horizontal direction, i.e., a longer side of a screen. Therefore, in a case where two LED substrates are mounted, the LED driver substrates are disposed in the vicinity of the center of the chassis panel in a horizontal direction of the chassis panel.

Further, it is preferable that the LED backlight according to a preferred embodiment of the present invention is arranged such that the plurality of LED substrates are symmetrically mounted on the chassis panel so that a longer side of each of the plurality of LED substrates is parallel or substantially parallel to a first direction, and the at least one LED driver substrate is mounted on the chassis panel so that a longer side of the at least one LED driver substrate is parallel or substantially parallel to a second direction which intersects with the first direction.

The above arrangement makes it possible to more efficiently drive each of the LED substrates and connect the LED substrates via the LED driver substrate.

For example, in a case where a large area is irradiated, LED substrates may be arranged in a plurality of columns (e.g., two to four columns) in a column direction (vertical direction of the screen) and in a plurality of rows in a row direction (horizontal direction of the screen) so that a longer side of each of the LED substrates is parallel or substantially parallel to the horizontal direction (row direction) of the screen.

In cases where (i) LED substrates are thus arranged in a plurality of rows and (ii) an LED driver substrate provided on a rear surface of a chassis panel (surface opposite to the surface on which the LED substrates are mounted) is disposed in a direction (column direction) that is perpendicular or substantially perpendicular to a main direction (row direction), it becomes easy to control a plurality of LED substrates with use of one LED driver substrate and to electrically connect the plurality of LED substrates via the LED driver substrate.

Further, the LED backlight according to a preferred embodiment of the present invention may be arranged such that the electrical connection through the connection hole is made with use of a wire.

The above arrangement makes it possible to easily connect the LED substrates to the LED driver substrate and connect the LED substrates to one another.

Further, it is preferable that the LED backlight according to a preferred embodiment of the present invention is arranged such that the LED substrate has a connector, positioned so as to face the connection hole when the LED substrate is mounted on the chassis panel, which provides an electrical connection.

Generally, in a case where a connector for electrical connection is provided on that surface of a chassis panel on which an LED has been provided, an LED backlight may increase in thickness as described above. Further, for an electrical connection to the connector, it becomes necessary for a wire and a jig for holding the wire to be provided on the surface on which the LED has been provided. This may cast an optical shadow as described above. The occurrence of such a shadow is remarkable in an arrangement in which an obstacle such as the wire is provided in the vicinity of the LED.

In view of this, according to the above arrangement, a connector is provided on such a surface of the LED substrate so as to make contact with the chassis panel when the LED substrate is mounted on the chassis panel, and is positioned so as to, when the LED substrate is mounted on the chassis panel, fit into the connection hole provided in the chassis panel.

Therefore, the connector does not make contact with the chassis panel in a height direction of the connector, i.e., in a thickness direction of the chassis panel. That is, since the connection hole serves as a space in which the connector is mounted, it is possible to prevent an increase in thickness of the LED backlight.

Further, it is possible to secure a sufficient height from a viewpoint of fitting strength (engaging strength) and ease of handling. This in turn means a wide range of options for connectors, and it is possible to prevent lowering of reliability and workability due to a height limit on a connector.

Further, a light-emitting element generally emits heat. Especially, an LED emits a great amount of heat. Therefore, in a case where an LED is used as a light-emitting element, it is increasingly necessary to radiate heat from the LED. In order to radiate heat, it is preferable that an LED substrate be in close contact with a chassis panel.

In view of this, according to the above arrangement, the connector does not make contact with the chassis panel. Therefore, the LED substrate can be in close contact with the chassis panel. Therefore, it is possible to secure good heat radiation performance.

Further, it is preferable that the LED backlight according to a preferred embodiment of the present invention is arranged such that the LED substrate has a connector, positioned so as to face the connection hole when the LED substrate is mounted on the chassis panel, which provides an electrical connection; the LED driver substrate is provided with a connector arranged to fit into the connector provided in the LED substrate; and the connector of the LED driver substrate and the connector of the LED substrate fit together so that the LED substrate and the LED driver substrate are electrically connected to each other through the connection hole.

According to the above arrangement, the LED substrate is electrically connected directly to the LED driver substrate. This eliminates the use of a wire for electrically connecting the LED substrate to the LED driver substrate, thus making it possible to further improve assembling workability.

Further, in another preferred embodiment of the present invention, it is preferable that a liquid crystal display device includes one of the above-described LED backlights.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred Embodiment 1

Figure 1:
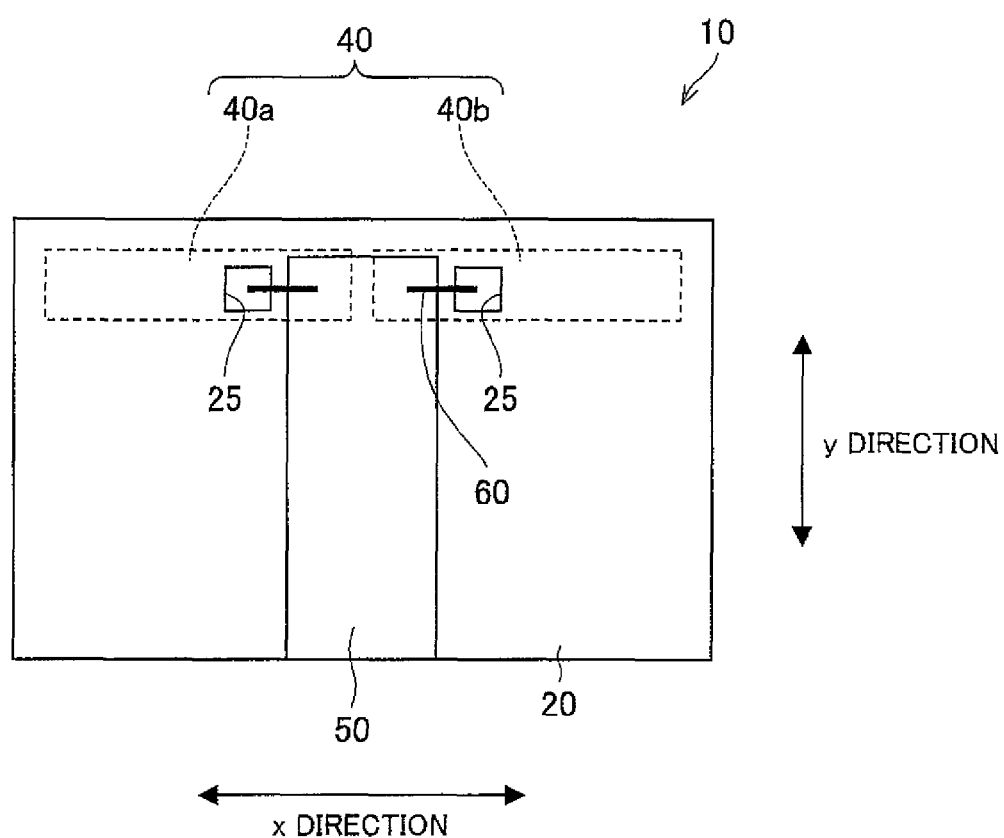
FIG. 1, showing a preferred embodiment of the present invention, illustrates an arrangement of an LED backlight.

One preferred embodiment of the present invention is described below with reference to FIG. 1. FIG. 1 illustrates an arrangement of an LED backlight 10 of the present preferred embodiment. In FIG. 1, the LED backlight 10 is viewed from that surface (rear surface) of a chassis panel 20 on which an LED (not shown) is not provided.

Components

As shown in FIG. 1, the LED backlight 10 of the present preferred embodiment preferably includes: an LED (light-emitting diode; not shown) serving as a light source; an LED substrate 40 on which the LED is mounted; an LED driver substrate 50 arranged to generate a power supply and a signal for driving the LED, the chassis panel 20 on which the LED substrate 40, the LED driver substrate 50 are fixed, and a wire 60 arranged to connect the LED substrate 40 to the LED driver substrate 50.

Structure

The LED backlight 10 of the present preferred embodiment is arranged such that the LED substrate 40 and the LED driver substrate 50 are mounted on different surfaces of the chassis panel 20 and are electrically connected to each other through a connection hole 25 provided in the chassis panel 20.

As shown in FIG. 1, the LED backlight 10 of the present preferred embodiment is arranged such that the LED substrate 40 provided with the LED (not shown) is mounted on one surface of the chassis panel 20. Specifically, the LED substrate 40 is preferably provided with one or more LEDs, and has a substantially rectangular shape, for example. Further, the LED backlight 10 includes a plurality of such LED substrates 40.

More specifically, two LED substrates 40 (first LED substrate 40*a*, second LED substrate 40*b*) are disposed in the vicinity of one longer side of the chassis panel 20, which has a substantially rectangular shape, in alignment with each other in each of the x directions (see the double-headed arrow of FIG. 1) along the one longer side.

Note that, for convenience of explanation, FIG. 1 shows an example in which only one row of LED substrates 40 (first LED substrate 40*a*, second LED substrate 40*b*) is disposed in each of the y directions (see the double-headed arrow of FIG. 1) of the chassis panel 20. However, the way the LED substrates 40 are disposed in the present preferred embodiment is not limited to the above arrangement. For example, it is possible that plural rows of LED substrates 40 (first LED substrate 40*a*, second LED substrate 40*b*) are disposed in each of the y directions (see the double-headed arrow of FIG. 1) of the chassis panel 20.

The effects and advantages to be described below can also be brought about by arranging the LED backlight 10 of the present preferred embodiment such that plural rows of LED substrates 40 are disposed in each of the y directions (see the double-headed arrow of FIG. 1) of the chassis panel 20 so that longer sides of each of the LED substrates 40 is parallel or substantially parallel to each of the x directions (see the double-headed arrow of FIG. 1) of the chassis panel 20. Furthermore, the arrangement in which the plural rows of LED substrates 40 are disposed makes it possible to further improve in-plane uniformity of brightness.

Further, the way the plural rows of LED substrates 40 are disposed in each of the y directions (see the double-headed arrow of FIG. 1) of the chassis panel 20 can be applied to other preferred embodiments to be described below.

On the other hand, the LED driver substrate 50 is mounted on a surface of the chassis panel 20 on which the LED substrates 40 are not mounted. Specifically, the LED substrate 40 has a substantially rectangular shape, and is mounted on a substantially central position on the chassis panel 20 so that a longer side of the LED driver substrate 50 is parallel to each of the y directions (see the double-headed arrow of FIG. 1), which are parallel to a shorter side of the rectangular chassis panel 20.

Further, connection holes 25 are provided in those portions of the chassis panel 20 in which the LED substrates 40 have been mounted, i.e., those portions of the chassis panel 20 which make contact with rear surfaces of the LED substrates 40, so as to pass through the chassis panel 20. In the present preferred embodiment, the connection holes 25 are provided in positions corresponding to the rear surfaces of the LED substrates 40 as described above, but not in a position corresponding to a rear surface of the LED driver substrate 50. In other words, the connection holes 25 are provided in positions other than positions where the LED driver substrate 50 overlaps the LED substrates 40.

As shown in FIG. 1, the LED driver substrate 50 is electrically connected to the LED substrates 40 by wires 60 through the connection holes 25.

Wire Length and the Like

With this arrangement, the LED driver substrate 50 can be connected to each of the LED substrates 40 at a short distance from each other. This allows a reduction in wire length.

Further, since the wires go through the chassis panel 20 so that the LED driver substrate 50 can be connected to each of the LED substrates 40 at the substantially shortest distance from each other, it is possible to easily carry out wiring, and to improve workability. This results in a reduction in manufacturing cost.

Further, the wires do not need to straddle the outer edge of the chassis panel 20 to provide connection between each of the LED substrates 40 and the LED driver substrate 50 mounted on different surfaces of the chassis panel 20. As a result, it is possible to reduce the frame width of the chassis panel 20.

Further, on that surface of the chassis panel 20 on which the LEDs have been provided, there are no connectors or wires for providing connection between each of the LED substrates 40 and the LED driver substrate 50. With this arrangement, shadows and reflection irregularities due to light from the LEDs hardly occur. As a result, it is possible to prevent deterioration in in-plane uniformity of brightness of the LED backlight 10.

Further, since it is not necessary to provide a connector or wire on that surface of the chassis panel 20 on which the LEDs have been provided, it is possible to prevent an increase in thickness of the LED backlight 10.

In the present preferred embodiment, it is preferable that the LED driver substrate 50 be mounted so as to be positioned between the two LED substrates 40. In other words, it is preferable that the LED driver substrate 50 be positioned at equal distances from the two LED substrates 40.

This arrangement makes it possible to prevent an increase in length of a wire 60 connecting an LED substrate 40 to the LED driver substrate 50.

Further, it is preferable that, as mentioned above, the connection holes 25 be provided in the positions corresponding to the rear surfaces of the LED substrates 40 and be positioned as close as possible to the LED driver substrate 50.

This arrangement makes it possible to further reduce the length of the wire 60 connecting the LED substrate 40 to the LED driver substrate 50.

Preferred Embodiment 2

Another preferred embodiment of the present invention is described below with reference to FIGS. 2 and 3. Note that the present preferred embodiment is identical to Preferred Embodiment except for arrangements described below. Further, for convenience of explanation, components having the same functions as those shown in the drawing of Preferred Embodiment 1 are given the same reference numerals, and therefore are not explained repeatedly.

An LED backlight 10 of the present preferred embodiment is different from the LED backlight 10 of Preferred Embodiment 1 in that connection holes 25 are provided in positions where an LED driver substrate 50 overlaps LED substrates 40. That is, the connection holes 25 are provided in positions corresponding to rear surfaces of the LED substrates 40 and in a position corresponding to a rear surface of the LED driver substrate 50.

As in Preferred Embodiment 1, the LED driver substrate 50 can be connected to each of the LED substrates 40 by a wire 60. However, the present preferred embodiment deals with a more desirable arrangement of the LED backlight 10 in which a connector 70 provides direct connection between the LED substrate 40 and the LED driver substrate 50. That is, the LED substrate 40 and the LED driver substrate 50 can be connected to each other not only by the connector 70 (described later) but also by the wire 60 even in a case where the connection holes 25 are provided in the positions corresponding to the rear surfaces of the LED substrates 40 and in the position corresponding to the rear surface of the LED driver substrate 50.

Figure 2:
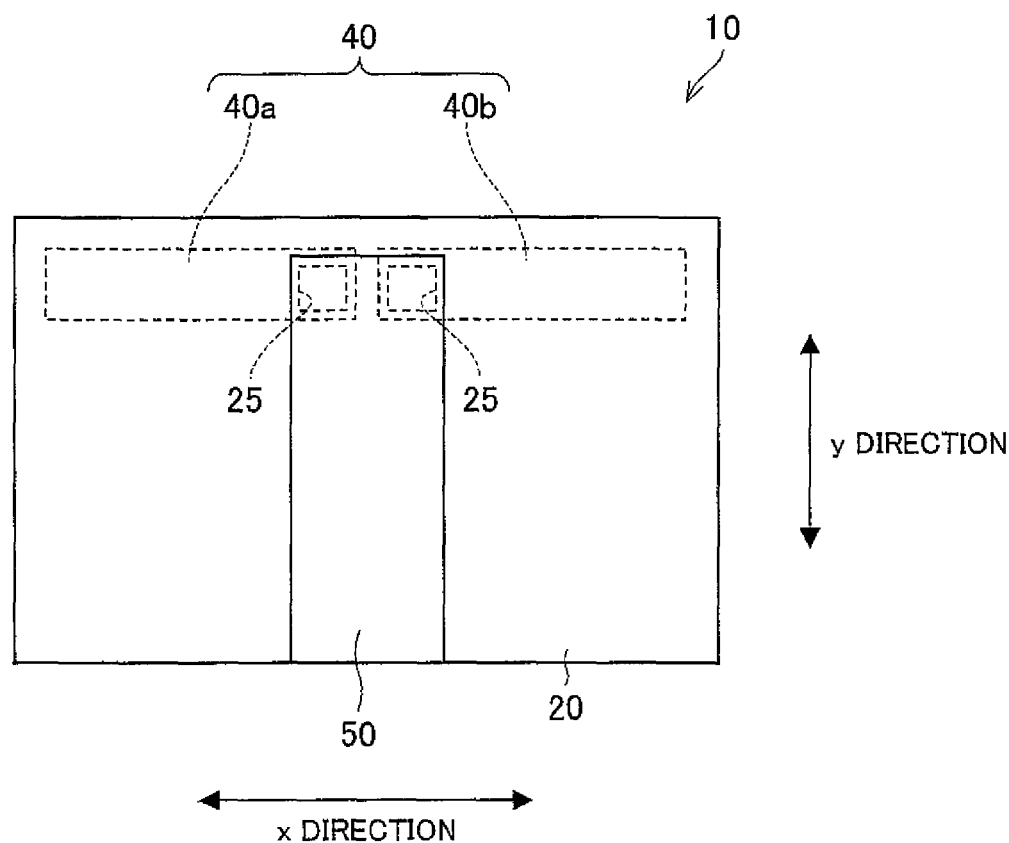
FIG. 2, showing another preferred embodiment of the present invention, illustrates an arrangement of an LED backlight.
Figure 3:
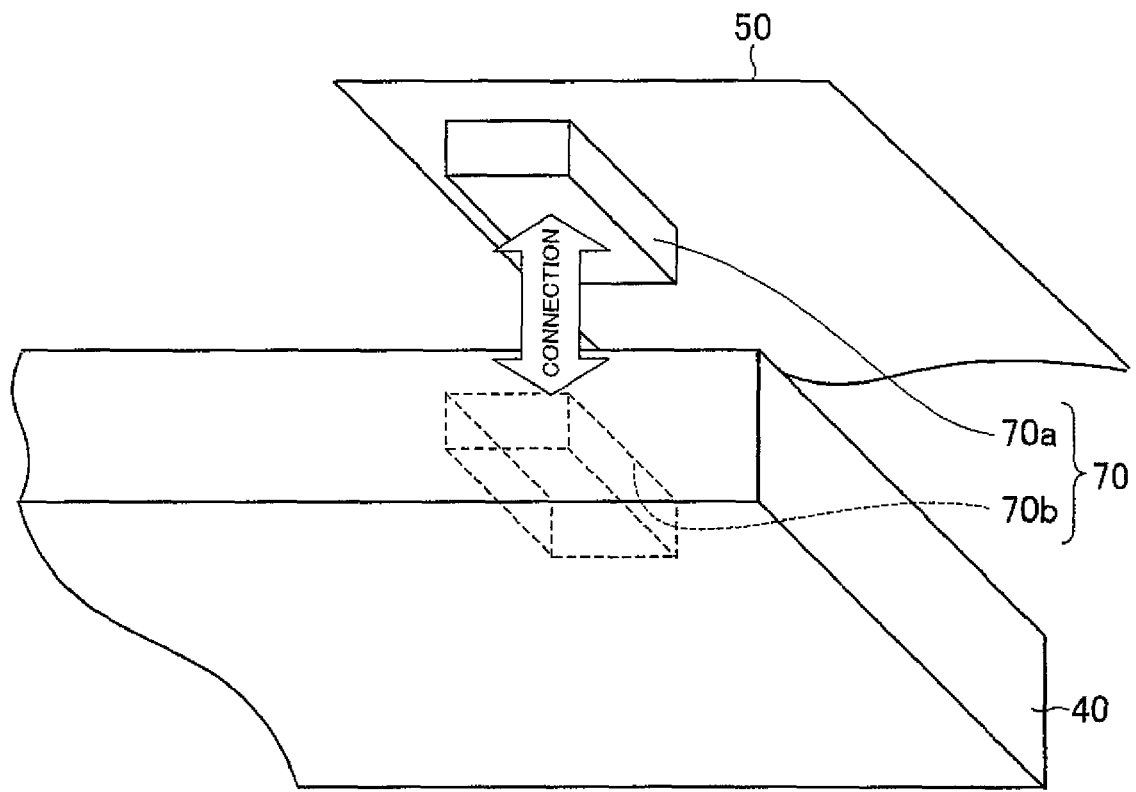
FIG. 3 illustrates how an LED substrate and an LED driver substrate are connected to each other.

The following description deals with the LED backlight 10 of the present preferred embodiment with reference to FIGS. 2 and 3. FIG. 2 illustrates an arrangement of the LED backlight 10 of the present preferred embodiment, and FIG. 3 illustrates how each of the LED substrates 40 and the LED driver substrate 50 are connected to each other. Note that, as is the case with FIG. 1, FIGS. 2 and 3 are diagrams obtained when the LED backlight 10 is viewed from a rear surface of the chassis panel 20.

As shown in FIG. 2, according to the LED backlight 10 of the present preferred embodiment, the connection holes 25 are provided in positions on the chassis panel 20 where the LED driver substrate 50 overlap the LED substrates 40. Specifically, the connection holes 25 are provided (i) in the vicinity of a location where two rectangular LED substrates 40 face each other when they are disposed in alignment with each other and (ii) in a location where the LED driver substrate 50 is provided.

The LED substrate 40 and the LED driver substrate 50 are not connected to each other by the wire 60, but connected to each other by the connector 70 in such a connection hole 25. The following description deals with this with reference to FIG. 3.

As shown in FIG. 3, the LED driver substrate 50 is provided with a convex insertion connector 70a serving as a connector 70 to be connected to an LED substrate 40.

On the other hand, the LED substrate 40 is provided with a concave receiving connector 70b into which the insertion connector 70a can be inserted. The insertion connector 70a may have a height larger than the width of the chassis panel 20. This is because, in this way, it is possible to more easily realize a direct connection between the LED substrate 40 and the LED driver substrate 50, which are mounted on different surfaces of the chassis panel 20.

The LED driver substrate 50 and the LED substrate 40 are mounted on the chassis panel 20 so that their respective connectors 70 (the insertion connector 70a of the LED driver substrate 50, the receiving connector 70b of the LED substrate 40) are positioned inside the connection hole 25. The insertion connector 70a of the LED driver substrate 50 and the receiving connector 70b of the LED substrate 40 fit together inside the connection hole 25 so as to provide connection (board to board connection) between the LED driver substrate 50 and the LED substrate 40.

This arrangement makes it possible to secure electrical conduction between the LED driver substrate 50 and the LED substrate 40 without using the wire 60, thus allowing a further improvement in assembling workability and a reduction in manufacturing cost.

Although the LED backlight 10 of the present preferred embodiment preferably uses the connector 70 to connect the LED driver substrate 50 and the LED substrate 40, the LED backlight 10 does not increase in thickness, because the height of a convex portion of the insertion connector 70a is absorbed by the width of the chassis panel 20 (depth of the connection hole 25) and the depth of the receiving connector 70b.

Further, as described above, the insertion connector 70a does not surface in the chassis panel 20. Therefore, the presence of the insertion connector 70 hardly causes deterioration in in-plane uniformity of brightness of the LED backlight 10.

The present preferred embodiment has discussed an example in which the LED driver substrate 50 is provided with the insertion connector 70a and the LED substrate 40 is provided with the receiving connector 70b. However, the present preferred embodiment is not limited to this. For example, another arrangement is possible in which the LED driver substrate 50 is provided with the receiving connector 70b and the LED substrate 40 is provided with the insertion connector 70a.

Preferred Embodiment 3

Figure 4:
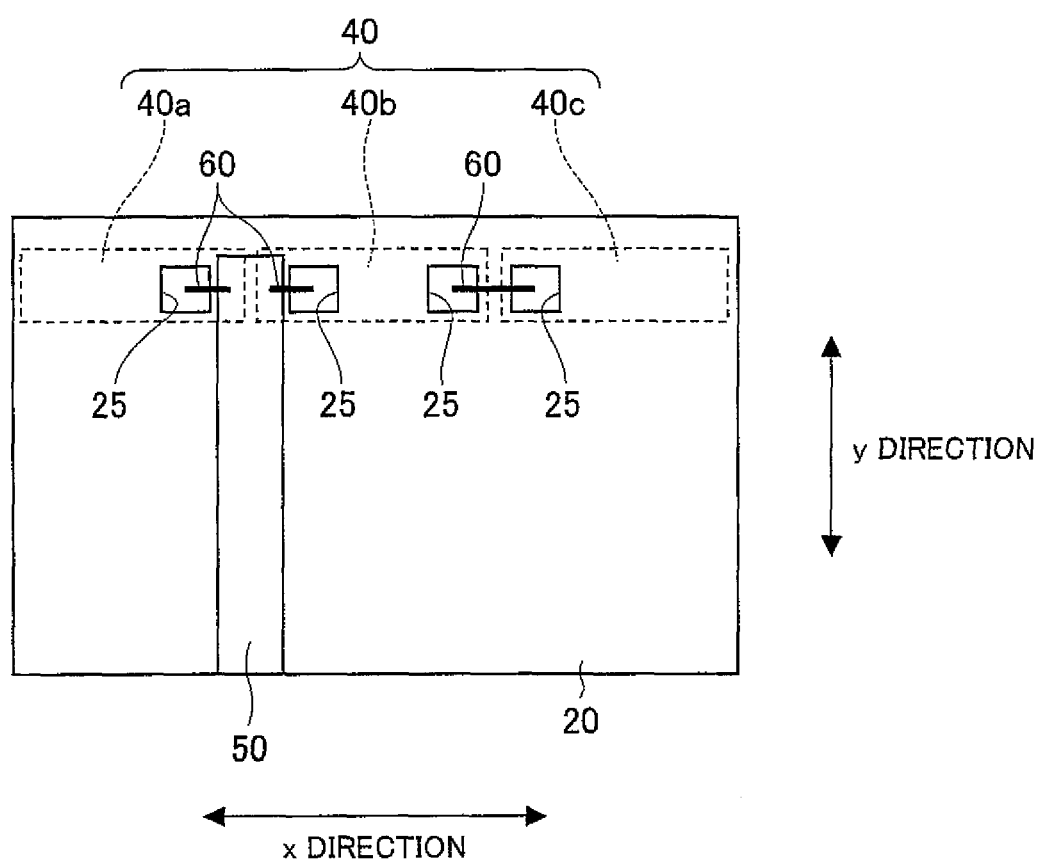
FIG. 4, showing another preferred embodiment of the present invention, illustrates an arrangement of an LED backlight.

Another preferred embodiment of the present invention is described below with reference to FIG. 4. FIG. 4 illustrates an arrangement of an LED backlight 10 of the present preferred embodiment.

Note that the present preferred embodiment is identical to Preferred Embodiment 1 except for arrangements described below. Further, for convenience of explanation, components having the same functions as those shown in the drawing of Preferred Embodiment 1 are given the same identical reference numerals, and therefore are not explained repeatedly.

Unlike the LED backlight 10 of Preferred Embodiment 1, the LED backlight 10 of the present preferred embodiment includes three LED substrates 40 (first LED substrate 40a, second LED substrate 40b, third LED substrate 40c). That is, the LED backlight 10 of the present preferred embodiment is arranged such that an additional LED substrate 40 is provided next to the second LED substrate 40b in an x direction in the LED backlight 10 of Preferred Embodiment 1. The following description deals with this arrangement.

As shown in FIG. 4, according to the LED backlight 10 of the present preferred embodiment, the three LED substrates 40 (first LED substrate 40a, second LED substrate 40b, third LED substrate 40c) are provided in the vicinity of one longer side of a substantially rectangular chassis panel 20 so as to be in alignment with one another in each of the x directions.

Further, as in Preferred Embodiment 1, an LED driver substrate 50 is mounted on a surface of the chassis panel 20 on which the LED substrates 40 are not provided. Specifically, the LED driver substrate 50, which preferably has a rectangular or substantially rectangular shape, is provided between two of the three LED substrates 40, i.e., between the first LED substrate 40a and the second LED substrate 40b so that a longer side of the rectangular LED driver substrate 50 is parallel or substantially parallel to each of the y directions, which are parallel or substantially parallel to a shorter side of the rectangular or substantially rectangular chassis panel 20.

Further, as in Preferred Embodiment 1, connection holes 25 passing through the chassis panel 20 are provided in those portions of the chassis panel 20 which make contact with rear surfaces of the LED substrates 40. Specifically, there are provided a total of four connection holes 25: one in that portion of the chassis panel 20 which contacts the first LED substrate 40a, one in that portion of the chassis panel 20 which contacts the third LED substrate 40c, and two in that portion of the chassis panel 20 which contacts the second LED substrates 40b, for example.

More specifically, (i) the one connection hole 25 provided in that region of the chassis panel 20 which contacts the rear surface of the first LED substrate 40a and (ii) one of the two connection holes 25 provided in that region of the chassis panel 20 which contacts the rear surface of the second LED substrate 40b are positioned in close proximity to each other.

Similarly, (i) the other one of the two connection holes 25 provided in that region of the chassis panel 20 which contacts the rear surface of the second LED substrate 40b and (ii) the one connection hole 25 provided in that region of the chassis panel 20 which contacts the rear surface of the third LED substrate 40c are positioned in close proximity to each other.

Further, as in Preferred Embodiment 1, the connection holes 25 are provided in positions corresponding to the rear surfaces of the LED substrates 40, but not in a position corresponding to the rear surface of the LED driver substrate 50. In other words, the connection holes 25 are provided in positions where the LED driver substrate 50 does not overlap the LED substrates 40.

Specifically, in the present preferred embodiment, the LED driver substrate 50 is provided between the first LED substrate 40a and the second LED substrate 40b as described above, and there is a region where the LED driver substrate 50 overlaps the LED substrates 40 (first LED substrate 40a, second LED substrate 40b). However, the connection holes 25 are not provided in this region.

Connection

The following description deals with how the LED substrates 40 are connected to the LED driver substrate 50.

The first LED substrate 40a and the second LED substrate 40b are connected to the LED driver substrate 50 in the same manner as in Preferred Embodiment 1. That is, the first LED substrate 40a and the second LED substrate 40b are connected to the LED driver substrate 50 preferably via wires 60 through connection holes 25, respectively. This allows the first LED substrate 40a and the second LED substrate 40b to be electrically connected to each other as if they were directly connected to each other.

The second LED substrate 40b and the third LED substrate 40c are directly connected to each other with use of a wire 60. Specifically, a rear surface of the second LED substrate 40b which is exposed through the connection hole 25 and a rear surface of the third LED substrate 40c which is exposed through the connection hole 25 are connected to each other with use of the wire 60.

As described above, according to the LED backlight 10 of the present preferred embodiment, even if the number of LED substrates 40 that are mounted on the chassis panel 20 increases, the LED substrates 40 can be connected to one another through the connection holes 25 provided in the chassis panel 20.

As a result, an increase in the number of LED substrates 40 hardly causes deterioration in in-plane uniformity of brightness, an increase in thickness, a large increase in wire length, a difficulty in wiring, and an increase in frame width.

Preferred Embodiment 4

Figure 5:
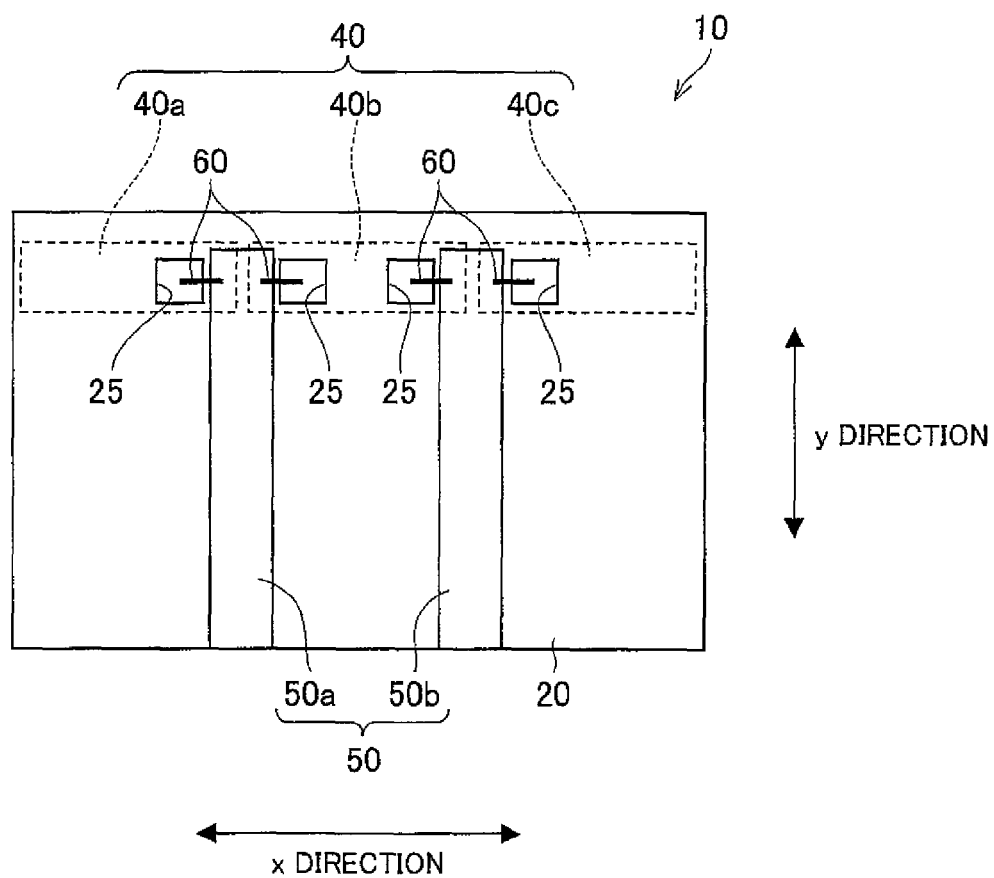
FIG. 5, showing another preferred embodiment of the present invention, illustrates an arrangement of an LED backlight.
Figure 6:
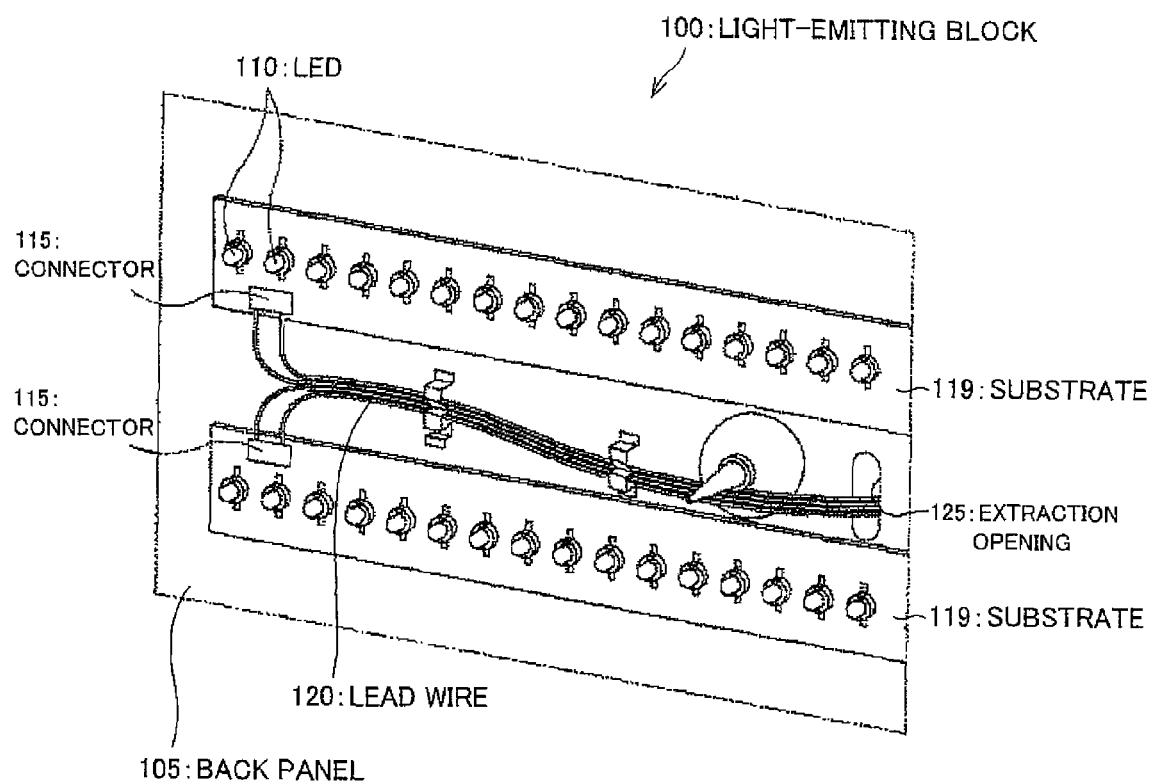
FIG. 6 illustrates a structure of a light-emitting block disclosed in Japanese Patent Application Publication, Tokukai, No. 2005-353498 A.
Figure 7:
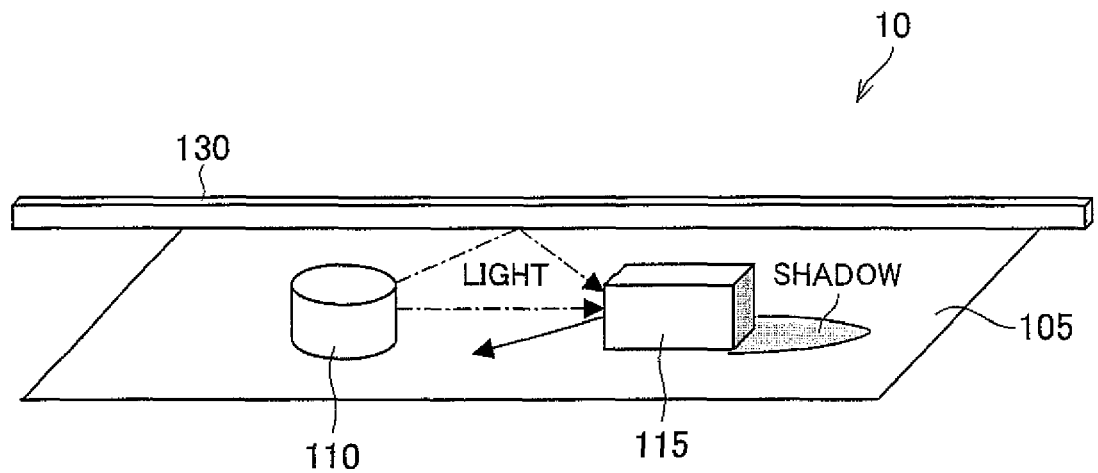
FIG. 7 illustrates an arrangement of an LED backlight provided with a connector.
Figure 8:
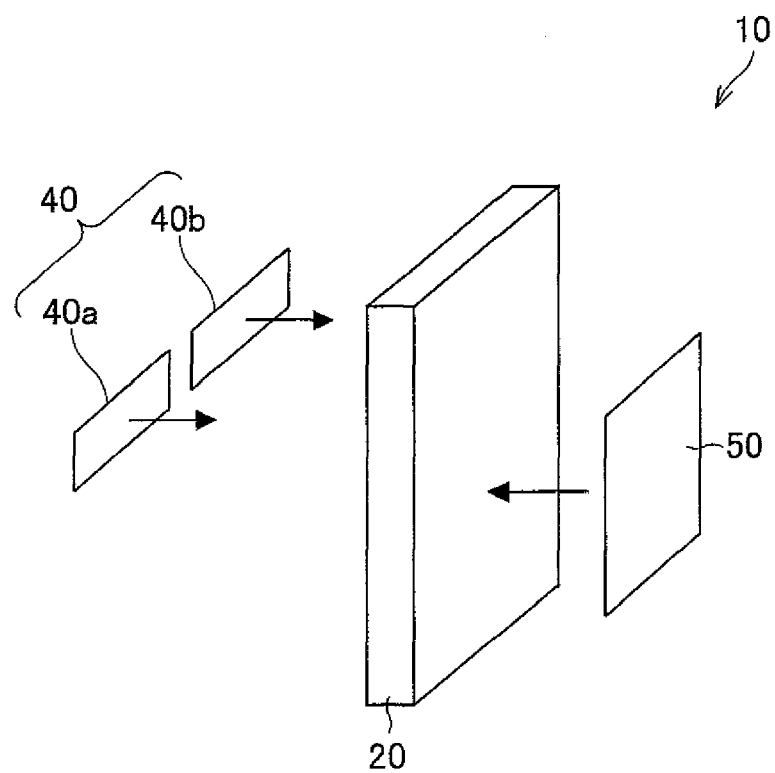
FIG. 8 illustrates a structure of an LED backlight in which an LED and an LED driver substrate are provided on different surfaces.
Figure 9:
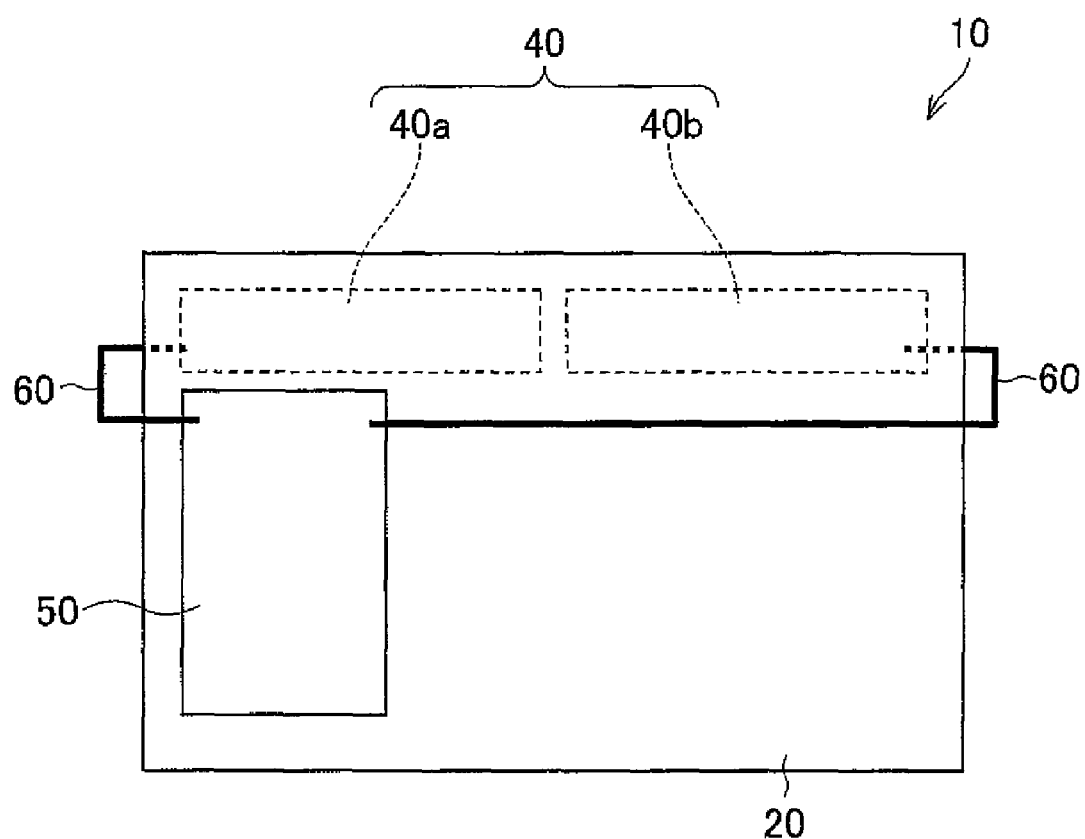
FIG. 9 illustrates a structure of an LED backlight in which an LED and an LED driver substrate are provided on different surfaces.

Another preferred embodiment of the present invention is described below with reference to FIG. 5. FIG. 5 illustrates an arrangement of an LED backlight 10 of the present preferred embodiment.

Note that the present preferred embodiment is identical to Preferred Embodiments above except for arrangements described below. Further, for convenience of explanation, components having the same functions as those shown in the drawings of Preferred Embodiments above are given the same reference numerals, and therefore are not explained repeatedly.

Unlike the LED backlight 10 of Preferred Embodiment 3, the LED backlight 10 of the present preferred embodiment includes two LED driver substrates (first LED driver substrate 50a, second LED driver substrate 50b). That is, an additional LED driver substrate 50 is provided between the second LED substrate 40b and the third LED substrate 40c in the LED backlight 10 of the Preferred Embodiment 3. The following description deals with this arrangement.

As shown in FIG. 5, according to the LED backlight 10 of the present preferred embodiment, the three LED substrates 40 (first LED substrate 40a, second LED substrate 40b, third LED substrate 40c) are provided in the vicinity of one longer side of a substantially rectangular chassis panel 20 so as to be in alignment with one another in each the x directions, as in Preferred Embodiment 3.

Further, as in Preferred Embodiment 3, the LED driver substrates 50 are provided on a surface of the chassis panel 20 on which surface the LED substrates 40 are not provided. It should be noted here that the LED backlight 10 of the present preferred embodiment preferably has two LED driver substrates 50, for example. Specifically, the two LED driver substrates 50, each of which has a rectangular or substantially rectangular shape, are each provided between two of the three LED substrates 40 in parallel with each other so that a longer side of each of the LED driver substrates 50 is parallel or substantially parallel to each of the y directions, which are parallel or substantially parallel to a shorter side of the rectangular chassis panel 20. More specifically, the first LED driver substrate 50a is provided between the first LED substrate 40a and the second LED substrate 40b, and the second LED driver substrate 50b is provided between the second LED substrate 40b and the third LED substrate 40c.

As in Preferred Embodiment 3, connection holes 25 passing through the chassis panel 20 are provided in those portions of the chassis panel 20 which make contact with rear surfaces of the LED substrates 40.

Specifically, there are preferably provided a total of four connection holes 25: one in that portion of the chassis panel 20 which contacts the first LED substrate 40a, one in that portion of the chassis panel 20 which contacts the third LED substrate 40c, and two in that portion of the chassis panel 20 which contacts the second LED substrates 40b, for example. More specifically, (i) the one connection hole 25 provided in that region of the chassis panel 20 which contacts the rear surface of the first LED substrate 40a and (ii) one of the two connection holes 25 provided in that region of the chassis panel 20 which contacts the rear surface of the second LED substrate 40b are positioned in close proximity to each other. Similarly, (i) the other one of the two connection holes 25 provided in that region of the chassis panel 20 which contacts the rear surface of the second LED substrate 40b and (ii) the one connection hole 25 provided in that region of the chassis panel 20 which contacts the rear surface of the third LED substrate 40c are positioned in close proximity to each other.

Further, as in Preferred Embodiment 1, the connection holes 25 are provided in positions corresponding to the rear surfaces of the LED substrates 40, but not in positions corresponding to the rear surfaces of the LED driver substrates 50, as described above. In other words, the connection holes 25 are not provided in positions where the LED driver substrates 50 overlap the LED substrates 40.

Specifically, in the present preferred embodiment, the connection holes 25 are provided in neither (i) a range in which the first LED driver substrate 50a overlaps the first LED substrate 40a or the second LED substrate 40b nor (ii) a range in which the second LED driver substrate 50b overlaps the second LED substrate 40b or the third LED substrate 40c.
Connection The following description deals with how the LED substrates 40 are connected to the LED driver substrates 50.

In the present preferred embodiment, the first LED driver substrate 50a is connected to the first LED substrate 40a and the second LED substrate 40b in the same manner as in Preferred Embodiment 1. As well, the second LED driver substrate 50b is connected to the second LED substrate 40b and the third LED substrate 40c in the same manner as in Preferred Embodiment 1.

That is, a rear surface of the first LED substrate 40a which is exposed through a connection hole 25 and a rear surface of the second LED substrate 40b which is exposed through a connection hole 25 are each connected to the first LED driver substrate 50a by a wire 60. Similarly, a rear surface of the second LED substrate 40b which is exposed through a connection hole 25 and a rear surface of the third LED substrate 40c which is exposed through a connection hole 25 are each connected to the second LED driver substrate 50b by a wire 60.

According to this arrangement, the LED substrates 40 are connected to the LED driver substrates 50. In addition, the first LED substrate 40a and the second LED substrate 40b are connected to each other via the first LED driver substrate 50a, and the second LED substrate 40b and the third LED substrate 40c are connected to each other via the second LED driver substrate 50b.

Therefore, even if the LED substrates 40 are required to exchange some sort of signal with each other, the LED substrates 40 can exchange such a signal without being directly connected to each other.

As described above, according to the LED backlight 10 of the present preferred embodiment, even if the number of LED substrates 40 to be provided on the chassis panel 20 and the number of LED driver substrates 50 to be provided on the chassis panel 20 increase, the LED substrates 40 and the LED driver substrates 50 can be connected to one another through the connection holes 25 provided in the chassis panel 20.

Therefore, an increase in the number of LED substrates 40 hardly causes deterioration in in-plane uniformity of brightness, an increase in thickness, a large increase in wire length, a difficulty in wiring, and an increase in frame width.

According to the above arrangement, the second LED substrate 40b is preferably connected to the two LED driver substrates 50. However, it is possible that the second LED substrate 40b is connected to either of the first LED driver substrate 50a and the second LED driver substrate 50b, for example, in a case where signal exchange between the LED substrates 40 is not required.

Further, in the above arrangement, the first LED driver substrate 50a and the second LED driver substrate 50b are provided separately from each other. However, the first LED driver substrate 50a and the second LED driver substrate 50b may be continuous with each other in some way so as to define one substrate.

Further, the number of LED substrates 40 is not limited to that described in each of the preferred embodiments, and also the number of LED driver substrates 50 is not limited to that described in each of the preferred embodiments. For example, the number of LED substrates 40 may be four or more.

Further, each of the preferred embodiments deals with a case where an LED substrate 40 is preferably separate from an LED driver substrate 50. However, the present invention is not limited to this. For example, an LED and an LED driver may be provided on the same substrate so that the LED substrate 40 and the LED driver substrate 50 integrate into one wiring substrate. Note that, even in such a case, it is necessary to supply a signal and power to the wiring substrate.

In view of this, connection holes 25 passing through the chassis panel 20 can be provided in that portion of the chassis panel 20 which contacts a rear surface of the wiring substrate, as in each of the preferred embodiments above, so as to improve efficiency of operation such as wiring operation.

As described above, an LED backlight 10 according to a preferred embodiment of the present invention is arranged such that (i) an LED substrate 40 provided with an LED is disposed on a rectangular or substantially rectangular chassis panel 20 so that a longer side of the LED substrate 40 is parallel or substantially parallel to a longer side of the chassis panel 20, that (ii) an LED driver substrate 50 which generates a required signal and transmits the signal to the LED substrate 40 is provided in the vicinity of the center of the chassis panel 20 so that a longer side of the LED driver substrate 50, which has a rectangular or substantially rectangular shape, is parallel or substantially parallel to a shorter side of the chassis panel 20, and that (iii) a connection hole 25 that is used for connecting the LED substrate 40 to the LED driver substrate 50 is provided in the chassis panel 20. This arrangement makes it possible to prevent a substrate member such as a wire 60 from sticking out over an edge of the LED backlight 10. This allows a reduction in frame width of the LED backlight 10. In addition, this allows a reduction in length of the wire 60 and a reduction in the number of contacts (connectors) for connecting the substrates, thus allowing an improvement in assembling workability and a reduction in cost.

The present invention is not limited to the description of the preferred embodiments above, but may be altered by a skilled person within the scope of the claims. A preferred embodiment based on a proper combination of technical features disclosed in different preferred embodiments is encompassed in the technical scope of the present invention.

As described above, an LED backlight according to a preferred embodiment of the present invention is arranged such that an LED is provided on one surface of an LED substrate, the LED substrate is mounted on a chassis panel so that a surface of the LED substrate opposite to the one surface contacts the chassis panel, and the chassis panel has a connection hole, provided in a portion of a region of the chassis panel in which region the LED substrate is mounted, which passes through the chassis panel. This makes it possible to realize an LED backlight in which deterioration in in-plane uniformity of brightness is prevented, whose thickness, frame width, and wire length are reduced, and in which wiring can is out easily.

An LED backlight according to a preferred embodiment of the present invention can be reduced in frame width and thickness, and has high assembling workability. Therefore, the LED backlight according to a preferred embodiment of the present invention can be suitably used for a large-sized display device in which a backlight such as a tandem backlight including a plurality of LED substrates is used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An LED backlight comprising:
an LED substrate;
an LED mounted on one surface of the LED substrate;
an LED driver substrate; and
a chassis panel on which the LED substrate is mounted such that a surface of the LED substrate opposite to the one surface contacts the chassis panel; wherein
the chassis panel has a connection hole, provided in a portion of a region of the chassis panel in which the LED substrate is mounted, which passes through the chassis panel; and
the connection hole is provided in a position where the LED driver substrate does not overlap the LED substrate.

2. The LED backlight as set forth in claim 1, wherein the LED driver substrate is arranged to drive the LED mounted on a surface of the chassis panel opposite to a surface on which the LED substrate is mounted, and the LED substrate and the LED driver substrate are electrically connected to each other through the connection hole.

3. The LED backlight as set forth in claim 2, further comprising a wire arranged to electrically connect the LED substrate and the LED driver substrate through the connection hole.

4. The LED backlight as set forth in claim 2, wherein:
the LED substrate includes a connector arranged to face the connection hole when the LED substrate is mounted on the chassis panel, which provides an electrical connection;
the LED driver substrate is provided with a connector arranged to fit into the connector provided in the LED substrate; and
the connector of the LED driver substrate and the connector of the LED substrate fit together so that the LED substrate and the LED driver substrate are electrically connected to each other through the connection hole.

5. The LED backlight as set forth in claim 1, wherein:
the chassis panel has a plurality of LED substrates mounted on a same surface thereof; and
the chassis panel has connection holes provided in regions thereof in which the plurality of LED substrates are mounted, respectively; and
at least two or more of the plurality of LED substrates are electrically connected to one another through the connection holes.

6. The LED backlight as set forth in claim 1, wherein:
the chassis panel has a plurality of LED substrates mounted on a same surface thereof; and
at least one additional LED driver substrate arranged to drive the LED is mounted on a surface of the chassis panel opposite to a surface on which the plurality of LED substrates are mounted; and
at least one of the at least one additional LED driver substrate is electrically connected to plural ones of the plurality of LED substrates through a plurality of the connection holes.

7. The LED backlight as set forth in claim 6, wherein:
the plurality of LED substrates are symmetrically mounted on the chassis panel so that a longer side of each of the plurality of LED substrates is parallel or substantially parallel to a first direction; and
the at least one additional LED driver substrate is mounted on the chassis panel so that a longer side of the at least one additional LED driver substrate is parallel or substantially parallel to a second direction which intersects with the first direction.

8. The LED backlight as set forth in claim 1, wherein the LED substrate includes a connector arranged to face the connection hole when the LED substrate is mounted on the chassis panel, which provides an electrical connection.

9. A liquid crystal display device comprising an LED backlight as set forth in claim 1.

* * * * *